United States Patent Office 2,805,928
Patented Sept. 10, 1957

---

2,805,928

PROCESS FOR RECOVERING RARE-EARTH OXIDES

John Bryant Kasey, Bakersfield, Calif.

No Drawing. Application August 1, 1956,
Serial No. 601,337

8 Claims. (Cl. 75—1)

This application for patent constitutes a continuation of my prior application Serial No. 290,559, Series of 1948, filed May 28, 1952, now abandoned.

This invention relates to a process for enriching the concentration of rare-earth oxides in an ore or ore concentrate. More particularly, it relates to a process for enriching the concentration of rare-earth oxides in an ore or ore concentrate containing rare-earth fluo-carbonates, fluorides, oxy-fluorides, boro-fluorides, or silico-fluorides as values and a gangue consisting chiefly of barite. For the purposes of this application, the term "rare-earths" is defined as elements whose atomic numbers lie between 57 and 71 inclusive.

The invention relates more particularly to a process of chemical conversion of values consisting of rare-earth fluo-carbonates, fluorides, oxy-fluorides, boro-fluorides, or silico-fluorides to rare-earth oxides, concurrent with the chemical conversion of substantially all the fluorine content of said values to water-soluble fluorides which may thereafter be removed, along with other water-soluble impurities, by leaching with water. Further, the invention relates to a process for recovering rare-earth oxides in a concentration of 60% or more from an ore or ore concentrate in which the gangue consists chiefly of barite, by chemically converting the values to rare-earth oxides, concurrently converting substantially all the fluorine content thereof to water-soluble fluorides, separating the latter and other water-soluble impurities from the former by leaching with water, and thereafter further concentrating the rare-earth oxides by gravity separation of barite therefrom.

Prior to this invention, it has not been possible to enrich sufficiently the concentration of rare-earth oxides in an ore or ore concentrate containing as values mineral fluo-carbonates, fluorides, oxyfluorides, boro-fluorides, or silico fluorides of rare-earth elements such as cerium or lanthanum, and containing a gangue such as barite. The difficulty in such cases is largely that gravity separation is not feasible, since the values have a specific gravity which is very close to that of the gangue. For example, the rare-earth fluo-carbonate, bastnasite, has a specific gravity of 5.2, while the specific gravity of barium sulfate, barite, is about 4.6. Thus, gravity separation to the necessary extent has not proved practically feasible. The separation is necessary if rare-earth oxides are to be prepared from such materials, which oxides are later to be reduced to mixed metals for such purposes as alloying in steel. In such applications, the sulphur content of the barite would be very detrimental. The separation is also of importance because the removal of the unwanted barite permits a considerable reduction in shipping cost. For these purposes, it is considered necessary that the concentrate contain a minimum of 60% rare-earth oxides. The production of such an oxide-content concentrate from such materials has heretofore not been accomplished.

I am aware that the treatment of minerals with various chemicals, thereby changing the specific gravity of one or more of the substances contained therein sufficiently to permit gravity separation is not generally novel. Thus, in U. S. 1,887,264 (Nov. 8, 1932), Grengle treats an ore with sodium bisulfate in the presence of an electrical current, and this treatment is followed by gravity separation. In U. S. 2,363,315 (Nov. 21, 1944), Grothe subjects an iron ore to a reducing roast, and follows this with gravity separation. These two inventions involve the treatment of minerals in such a way as to change the specific gravity of one or more substances, and therefore show that this principle is not generally novel, but they do not teach any method for enriching rare-earth oxide concentrations in materials of the type I treat.

In my process, I convert rare-earth fluo-carbonates, fluorides, oxy-fluorides, boro-fluorides, or silico-fluorides to rare-earth oxides by an oxidizing roast in the presence of an alkali-metal carbonate, bicarbonate, nitrate, peroxide, or hydroxide. This has the effect of converting the rare-earth compounds to oxides, and concurrently converting the fluorine content of the material being treated to a water-soluble alkali-metal fluoride, which is then removed, along with other water-soluble impurities, by leaching with water. Subsequently, I may separate barite from the rare-earth oxides, if this is necessary in order to achieve a 60% concentration of rare-earth oxides.

I am aware that roasting in the presence of alkali-metal carbonates is not generally novel (see: Westby, U. S. 2,038,399, April 21, 1936), nor that roasting in the presence of an alkali-metal nitrate is not generally novel (see: Hammarberg, U. S. 2,123,240, July 12, 1938). However, neither of these patents teaches any method of treating rare-earth minerals, nor of reacting with fluorine-containing materials, the former using an alkali simply to neutralize silica in a metallic silicate ore, and the latter being used to treat iron ore.

I am also aware of the fact that heating a rare-earth material with sodium carbonate, and then leaching with water, is not broadly novel. Urbain, in Annales de Chimie et de physique (7th Series), vol. 19, pages 202–206, mentions such a process, in which he treats a material containing rare-earth oxides or complex oxides as values and silica and phosphoric acid as gangue, at a temperature of about 500–600° C., with sodium carbonate. However, in Urbain's treatment, the reagent does not react with the values (since they are already in the oxide form), but reacts instead with the gangue, neutralizing the silica and phosphoric acid. The products of this neutralization are then leached out with water. Urbain's process thus is inapplicable to materials of the type which I treat, i. e. materials which contain fluorine and must be chemically converted by reaction with the alkali-metal reagent under oxidizing conditions to the oxide form.

In another of my inventions for which a patent has been granted (U. S. 2,735,747, Feb. 21, 1956), I subject a material containing rare-earth carbonates to a temperature high enough to convert them to rare-earth oxides, by driving off carbon dioxide, thereby greatly increasing the specific gravity of the rare-earth materials, so that gravity separation of gangue may thereafter be accomplished. In the present application, however, I am able to treat rare-earth ores or ore concentrates containing compounds which are not convertible to oxides merely upon heating, since they also contain fluorine. Thus, my present invention goes one step further than my previously patented invention, in that it makes it possible for the first time to produce high rare-earth oxide concentrations from materials containing as values rare-earth fluo-carbonates, fluorides, oxy-fluorides, boro-fluorides, or silico-fluorides, and as gangue chiefly barite.

Thus, an object of the present invention is to convert rare-earth fluo-carbonates, fluorides, oxy-fluorides, boro-fluorides, or silico-fluorides to rare-earth oxides by treatment at elevated temperature under oxidizing conditions with an alkali-metal carbonate, bicarbonate, nitrate, peroxide, or hydroxide, concurrently converting substantially all the fluorine content of the rare-earth compounds to water-soluble alkali-metal fluorides, which can then be removed by leaching with water. A further object is to convert rare-earth fluo-carbonates, fluorides, oxy-fluorides to rare-earth oxides by treatment at elevated temperature under oxidizing conditions with an alkali-metal carbonate, bicarbonate, nitrate, peroxide, or hydroxide, concurrently converting substantially all the fluorine content of the rare-earth compounds to water-soluble alkali-metal fluorides, subsequently removing such fluorides by leaching with water, and then separating barite from the rare-earth oxides by gravity separation.

A further object is to permit the separation of the valuable mineral bastnasite from the less desirable mineral barite, thereby producing a concentrate containing at least 60% rare-earth oxides, hereinafter referred to as REO. Another object is to produce a concentrate practically free of barite and consisting virtually entirely of rare-earth oxides. A further object is to produce a concentrate higher in total REO content than is possible even if the concentrate consisted of pure bastnasite and no barite gangue. Still another object is to convert the fluorine content of any of the above-mentioned fluoride compounds into a useful form such as sodium fluoride.

Other objects and advantages of the invention will more fully appear from the following description, wherein are disclosed preferred modes of carrying out the invention.

In the preferred mode of carrying out the present invention, the starting material is a mixed concentrate of bastnasite and barite, lighter gangue minerals having been removed during a prior milling operation. This primary, mixed concentrate contains a widely variable percentage of REO as bastnasite, depending on relative ratios of light gangue and barite, but contains less than 60% oxides. To such a mixed concentrate which has been dried, weighed and analyzed for REO and fluorine content there is added an amount of dry sodium carbonate equivalent to the fluorine content plus some excess (preferably 5 to 100% excess), and the whole is mixed thoroughly. The mixture is then subjected to a temperature within the range of approximately 850–1000° C. for a period of several hours. The reaction which ensues progresses quietly and results in the formation of water-soluble sodium fluoride and oxides of the rare earths. The mass on cooling assumes a more or less brick red color. Upon cooling, the mixture, which has lost a considerable part of its weight because of the evolution of carbon dioxide gas, is leached and washed with water to remove the soluble sodium fluoride mixed with a small quantity of sodium sulphate. The latter is formed by partial decomposition of the barite.

Since the difference in weight between the untreated mixed concentrate and the reacted and washed concentrate may vary from about 5% to 20%, depending on the percentage of fluo-carbonate present (the $CO_2$ of which is driven off) the resultant percentage of REO in the washed concentrate will be increased proportionately. Should the washed concentrate REO content be below standard, i. e. below 60%, then its REO content can be increased by slurrying with water to 5 to 10% solids, feeding it onto a gravity concentrating table, and washing the barite (specific gravity 4.6) into the tailings and away from the REO (specific gravity 7.0). The latter step of separating the barite by tabling yields a concentrate with maximum REO.

The sodium fluoride-sodium sulphate leaching water and wash water are further treated for the recovery of the sodium fluoride as such or as calcium fluoride by precipitation with a calcium salt.

To illustrate more clearly my invention, the following is a typical example: Fifty grams of a mixed bastnasite-barite concentrate, practically calcite-free and analyzing 59.6% REO, 3.18% fluorine, and 12% barite, were ground to minus 150 mesh and thoroughly mixed with 7 grams of dry, light anhydrous sodium carbonate (57.6% excess). The mixture was placed in an iron crucible, and subjected to a temperature of 850° C. in an electric muffle furnace for two hours. The reaction between the bastnasite and sodium carbonate proceeded quietly and without any visible evidence of activity, although carbon dioxide was evolved from the porous mass. Sodium fluoride and rare-earth oxides were formed simultaneously. At the conclusion of the two-hour period, the lightly sintered product was cooled and placed in 200 cc. of water and leached for two hours. The residue of rare-earth oxides and barite was filtered and washed free of sodium fluoride and sodium sulphate. The washed and dried rare-earth oxides and barite now weighed 39.39 grams, indicating a loss of 10.61 grams or 21.2%, due to loss of carbon dioxide and solution of fluorine. The REO content of this rare-earth-barite residue was 75.5%, an increase of 26.6% in REO content due to heat treatment and reaction with the added sodium carbonate. The specific gravity of the rare-earth oxides was now 7.0. The difference in specific gravity between them and the barite therefore enabled their separation by gravity concentration, the much lighter barite being easily washed into the tailings. Oxides obtained by such a concentration process analyzed 96.6% REO and 2.25% barite, with recovery averaging 93%.

While I have specifically employed sodium carbonate in the above example, it should be understood that certain other substances may be similarly used and substituted for it as equivalents, singly or mixed, in effecting the decomposition and conversion of bastnasite and the other above-enumerated fluorine minerals to the oxide form. Such equivalents of sodium carbonate include the carbonates, bicarbonates, nitrates, peroxides, and hydroxides of the alkali-metals. These substances have in common with each other the property of being converted to alkali-metal oxides upon heating within the range 850–1000° C. In addition any other alkali-metal or alkali-metal compound which is converted to an alkali-metal oxide upon heating within the range of 850–1000° C. in atmospheric air or in the presence of an oxidizing agent constitutes an equivalent of the reagents mentioned above. This includes the alkali-metal elements sodium, potassium, and lithium, and their nitrites and cyanides.

Some examples of the practice of my invention when equivalents are employed instead of using sodium carbonate as the reagent follow. In each of these examples, a mixed bastnasite-barite concentrate, practically calcite free and analyzing 59.6% REO, 3.18% fluorine, and 12% barite, ground to minus 150 mesh, was treated. The method of treatment was essentially the same as that employed in the example above, wherein sodium carbonate was employed as the reagent.

| Wt. of sample, grams | Reagent | Wt. of reagent, grams | Wt. of leached oxide residue, grams |
|---|---|---|---|
| 15 | NaCN | 1.94 | 11.49 |
| 15 | NaOH | 1.59 | 11.41 |
| 15 | $NaNO_3$ | 3.36 | 11.55 |
| 15 | $NaNO_2$ | 2.73 | 11.54 |

In each case, the excess of reagent was 57.6%, and the recovery of fluorine in the filtrate was found to be essentially 100% complete.

While certain novel features of this invention have been disclosed and are pointed out in the following claims, it will be understood that various omissions, substitutions, and changes may be made by those skilled in the art without departing from the spirit of the invention.

I claim:
1. A process for recovering rare-earth oxides in a concentration exceeding approximately 60% from a solid rare-earth-containing material containing a mixture of values which comprise minerals selected from the group consisting of rare-earth fluo-carbonates, fluorides, oxy-fluorides, boro-fluorides, and silico-fluorides, and a gangue consisting chiefly of barite, which comprises the novel steps of: heating said rare-earth-containing material under oxidizing conditions to a temperature within the range of approximately 850–1000° C. in the presence of a reagent selected from the group consisting of the carbonates, bicarbonates, nitrates, peroxides, and hydroxides of the alkali metals to form water-soluble alkali-metal fluoride and sulphate salts and to convert the rare-earth compounds to oxides, the amount of said reagent being substantially chemically equivalent to the fluorine content of said rare-earth-containing materials; continuing said heating until substantially all the values in said rare-earth-containing material have been converted to rare-earth oxides and substantially all the fluorine content of said values has been converted to soluble alkali-metal fluorides; and thereafter leaching the treated material with water to remove the soluble alkali-metal fluorides and sulfates therefrom.

2. A process for recovering rare-earth oxides in a concentration exceeding approximately 60% from a solid rare-earth-containing material containing a mixture of values which comprise minerals selected from the consisting of rare-earth fluo-carbonates, fluorides, oxy-fluorides, boro-fluorides, and silico-fluorides, and a gangue consisting chiefly of barite, which comprises the novel steps of: heating said rare-earth-containing material under oxidizing conditions to a temperature within the range of approximately 850–1000° C. in the presence of a reagent selected from the group consisting of the carbonates, bicarbonates, nitrates, peroxides, and hydroxides of the alkali metals to form water-soluble alkali-metal fluoride and sulphate salts and to convert the rare-earth compounds to oxides, the amount of said reagent being substantially chemically equivalent to the fluorine content of said rare-earth-containing materials; continuing said heating until substantially all the values in said rare-earth-containing material have been converted to rare-earth oxides and substantially all the fluorine content of said values has been converted to soluble alkali-metal fluorides; thereafter leaching the treated material with water to remove the soluble alkali-metal fluorides and sulfates therefrom; and thereafter further concentrating the rare-earth oxides by gravity separation of barite therefrom.

3. The process of claim 1, wherein the rare-earth is selected from the group consisting of cerium, lanthanum, and mixtures thereof.

4. The process of claim 2, wherein the rare-earth is selected from the group consisting of cerium, lanthanum, and mixtures thereof.

5. The process of claim 1, wherein said reagent is sodium carbonate.

6. The process of claim 2, wherein said reagent is sodium carbonate.

7. The process of claim 1, wherein the rare-earth is selected from the group consisting of cerium, lanthanum, and mixtures thereof, and wherein said reagent is sodium carbonate.

8. The process of claim 2, wherein the rare-earth is selected from the group consisting of cerium, lanthanum, and mixtures thereof, and wherein said reagent is sodium carbonate.

References Cited in the file of this patent
UNITED STATES PATENTS

| | | |
|---|---|---|
| 1,546,854 | Miller | July 21, 1925 |
| 1,887,264 | Grenagle | Nov. 8, 1932 |
| 2,038,399 | Westby | Apr. 21, 1936 |
| 2,123,240 | Hammarberg | July 12, 1938 |
| 2,363,315 | Grothe | Nov. 21, 1944 |

OTHER REFERENCES

Annalles de chimie et de Physique (7th series), vol. 19, pages 202–206.

Comprehensive Treatise of Inorganic and Theoretical Chemistry, by Mellor, vol. 5, page 545; published in 1924 by Longmans, Green and Company, New York, N. Y.